(12) United States Patent
Palum et al.

(10) Patent No.: US 7,499,724 B2
(45) Date of Patent: Mar. 3, 2009

(54) EVENT SEQUENCER USED FOR CONTROLLING THE SEQUENCE AND TIMING OF EVENTS IN SOFTWARE DEFINED RADIO

(75) Inventors: Lloyd Palum, Rochester, NY (US); William B. Hunter, Rochester, NY (US); David Hinterberger, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 479 days.

(21) Appl. No.: 11/342,996

(22) Filed: Jan. 30, 2006

(65) Prior Publication Data

US 2007/0178946 A1 Aug. 2, 2007

(51) Int. Cl.
*H04Q 7/20* (2006.01)
(52) U.S. Cl. ............... 455/550.1; 455/90.1; 455/418
(58) Field of Classification Search .............. None
See application file for complete search history.

(56) References Cited

U.S. PATENT DOCUMENTS

| 3,932,847 | A | 1/1976 | Smith ............... 340/172.5 |
| 4,349,890 | A | 9/1982 | Chang ............... 364/900 |
| 5,040,158 | A | 8/1991 | Lee et al. ............... 368/10 |
| 5,327,468 | A | 7/1994 | Edblad et al. ............... 375/107 |
| 6,804,169 | B2 | 10/2004 | Addy et al. ............... 368/10 |
| 7,206,601 | B2* | 4/2007 | Mukai et al. ............... 455/552.1 |
| 2002/0137514 | A1* | 9/2002 | Mitsugi et al. ............... 455/436 |
| 2002/0184407 | A1 | 12/2002 | Shell et al. ............... 709/328 |
| 2003/0008684 | A1* | 1/2003 | Ferris ............... 455/561 |
| 2003/0114163 | A1 | 6/2003 | Bickle et al. ............... 455/450 |
| 2003/0149809 | A1 | 8/2003 | Jensen et al. ............... 710/22 |
| 2004/0133554 | A1 | 7/2004 | Linn et al. ............... 707/2 |
| 2005/0108382 | A1 | 5/2005 | Murotake et al. ............... 709/223 |
| 2007/0087734 | A1* | 4/2007 | Hinterberger et al. ............... 455/418 |
| 2007/0087735 | A1* | 4/2007 | March et al. ............... 455/418 |

OTHER PUBLICATIONS

Bourse et al., "End-to-End Reconfigurability Tutorial @ SDRF TC 05," Nov. 14, 2005, retrieved from the Internet. <URL: http://e2r.motlabs.com/training/05114_E2R_Tutorial_SDRFTC_Anaheim_v1.0.pdf/download> (214 pages).

Volger et al., "Equipment Management Framework for Reconfiguration: Architecture, Interfaces and Functions," Mar. 1, 2005, retrieved from the Internet, <URL: http://e2r.motlabs.com/Deliverables/E2R_WP2_D2.2_050103.pdf> (200 pages).

* cited by examiner

*Primary Examiner*—Erika A Gary
(74) *Attorney, Agent, or Firm*—Allen, Dyer, Doppelt, Milbrath & Gilchrist, P.A.

(57) ABSTRACT

A software defined radio has a radio circuit and executable radio software system operable with the radio circuit, and defining an operating environment that allows a waveform application to operate with the radio circuit for transmitting and receiving voice and data. A processor, such as a Field Programmable Gate Array (FPGA), is operable with the radio circuit and includes an event sequencer for controlling the sequence and timing of events in the radio circuit.

22 Claims, 4 Drawing Sheets

EVENT SEQUENCER USED FOR CONTROLLING THE SEQUENCE AND TIMING OF EVENTS IN SOFTWARE DEFINED RADIO

FIELD OF THE INVENTION

The present invention relates to software defined radios and to a software communications architecture (SCA) for radios and other applications.

BACKGROUND OF THE INVENTION

With advances in processing capabilities and programming technologies, software defined mobile wireless communications devices (e.g., radios) continue to increase in popularity. Rather than relying upon hardware and circuitry components to perform tasks such as frequency, modulation, bandwidth, security functions, and waveform requirements, these functions are performed by software modules or components in a software radio. That is, with a software radio, analog signals are converted into the digital domain where the above-noted functions may be performed using digital signal processing.

Because most of the functions of the radio are controlled by software, software radios may typically be implemented with relatively standard processor and hardware components. This may not only reduce device hardware costs, but also provides greater flexibility in upgrading the device since new communications waveform modules can be uploaded to the device relatively easily and without the need to interchange new hardware components.

One particular class of software radio, which takes advantage of the above-described advantages and features is the Joint Tactical Radio (JTR). The JTR radio includes relatively standard radio and processing hardware along with the appropriate waveform software modules for the communication waveforms the radio will use. JTR's also utilize operating system software that conforms with the Software Communications Architecture (SCA) Specification (see www.JTRS.saalt.mil), which is hereby incorporated by reference in its entirety. The SCA is an open architecture framework that specifies how hardware and software components are to interoperate so that different manufacturers and developers can readily integrate their respective components into a single device.

Still another class of mobile wireless communications devices that increasingly use software components for communicating with different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them; some may be implemented by non-core applications (i.e., waveforms, etc.); and some may be implemented by hardware device providers. The specifications for the JTRS radio and SCA typically require an interface for command and data (red and black) processing systems. A radio platform may include multiprocessor embedded systems, including Field Programmable Gate Arrays (FPGA's).

The wideband networking waveforms also require a high degree of control over events and a coordinated radio and modem configuration. This control typically must be synchronized to within microseconds. Usually in this type of radio, the configuration and control of radio hardware and modem hardware is accomplished in the software. This level of control, however, only provides a certain level of accuracy in the timing of that control.

SUMMARY OF THE INVENTION

In view of the foregoing background, it is therefore an object of the present invention to control the events within a software defined radio in a more accurate manner and exercise greater control over events in the radio circuit and reduce the number of real time events handled by the higher level software.

In accordance with one non-limiting example of the present invention, a software defined radio includes a radio circuit and executable radio software system operable with the radio circuit. An operating environment is defined that allows a waveform application to operate with the radio circuit for transmitting and receiving voice and data. A processor includes an event sequencer and is operative for controlling the sequence and timing of events in the radio circuit.

In yet another aspect, the event sequencer includes an event memory, such as an event queue or event CAM, for holding a series of events. The event queue or CAM can be accessed in any order, or a combination of event queue and event CAM connected such that one feeds into the other. Each event contained within the event memory could include an event command having a value used for identifying an event action to take place. A fractional bit time value could be indicative of the time for an event. The event sequencer could include a time comparator for causing an event to trigger at an appropriate time. This event sequencer could also include a processor for determining an event program to be run. The event sequencer could also include a tag register that holds event tags indicative of an event program to be run and operative for reading the tag register and determining which event program is to be run. A memory, timer and interrupt controller could be operative with the processor such that an interrupt can be generated at a specified time to allow the processor to read the tag register. The event sequencer is also operable for coordinating the configuration of the radio circuit and an associated modem control circuit. A portable housing can contain the radio circuit and processor and be configured for handheld use.

In yet another aspect, a radio circuit and executable radio software system is operative with the radio circuit and conforms to the software communications architecture (SCA) specification and defines an operating environment that allows a waveform application to operate with the radio circuit for transmitting and receiving voice and data. A Field Programmable Gate Array (FPGA) is operable with the radio circuit and includes an event sequencer for controlling the sequence and timing of events in the radio circuit. This event sequencer includes sequencer components in which events and event tags are held and processor components operative with the sequencer components for identifying event tags and running event programs identified by the event tags.

A method aspect of the invention is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The event sequencer, in accordance with one non-limiting example of the present invention, can be a hardware based micro-coded event sequencer that is integrated into the Field Programmable Gate Array (FPGA) processing resources of the software defined radio. This allows the software of the wideband networking waveform to control the sequence and timing of events and "script" a timeline of control for the radio circuit and associated modem to within microsecond accuracy, by delegating the sequence of control to this hardware construct.

Figure 1:
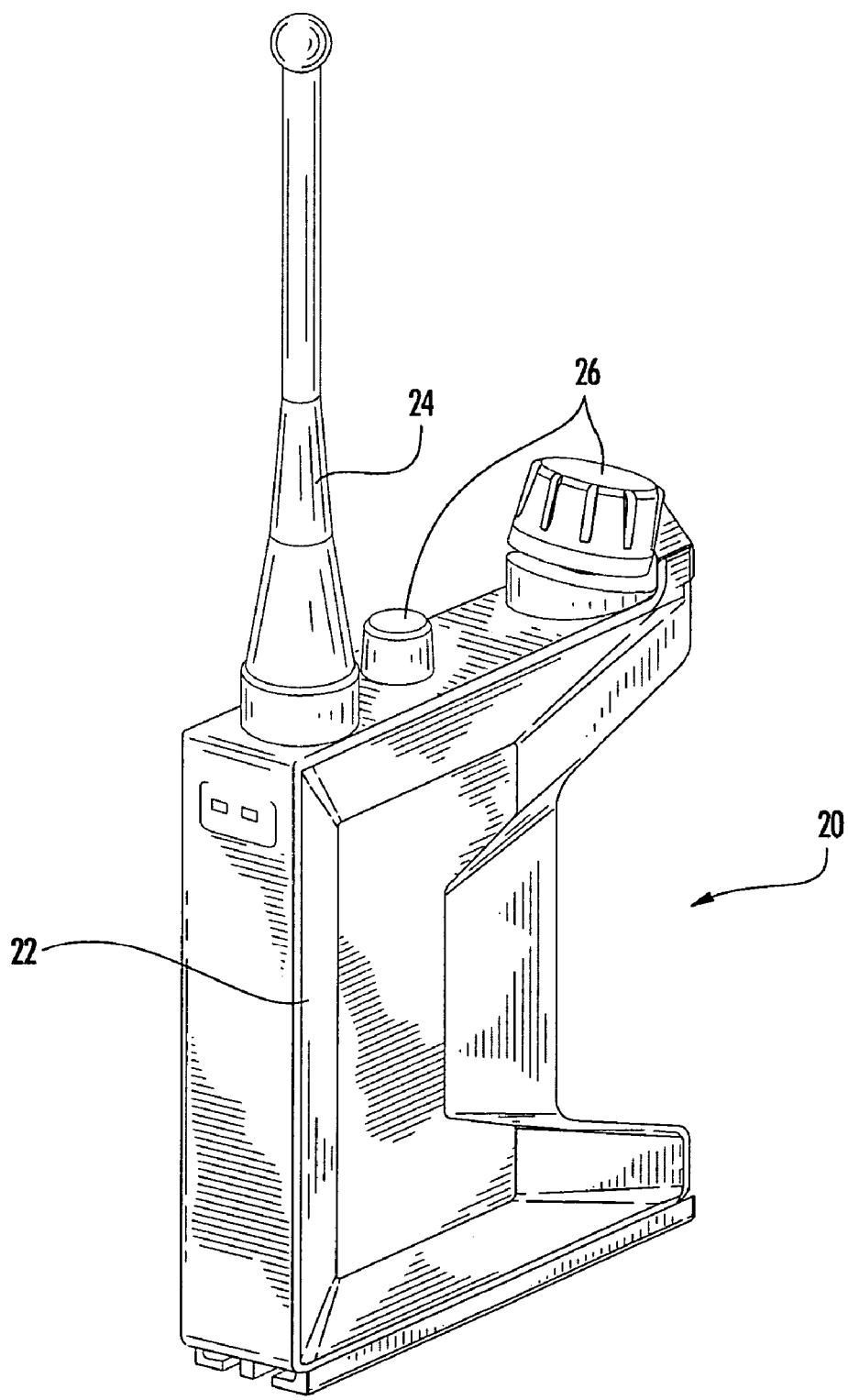
FIG. 1 is perspective view of a portable wireless communications device as a handheld radio that could incorporate the event sequencer in accordance with a non-limiting example of the present invention.

The event sequencer and related methods, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 20 as illustrated in FIG. 1. The portable wireless communications device is illustrated as a radio that can include a transceiver as an internal component and handheld housing 22 with an antenna 24 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver using SCA and the event sequencer in accordance with non-limiting examples of the present invention. An example of a communications device that could incorporate the event sequencer, in accordance with non-limiting examples of the present invention, is the Falcon® III manpack or tactical radio platform manufactured by Harris Corporation of Melbourne, Fla.

Figure 2:
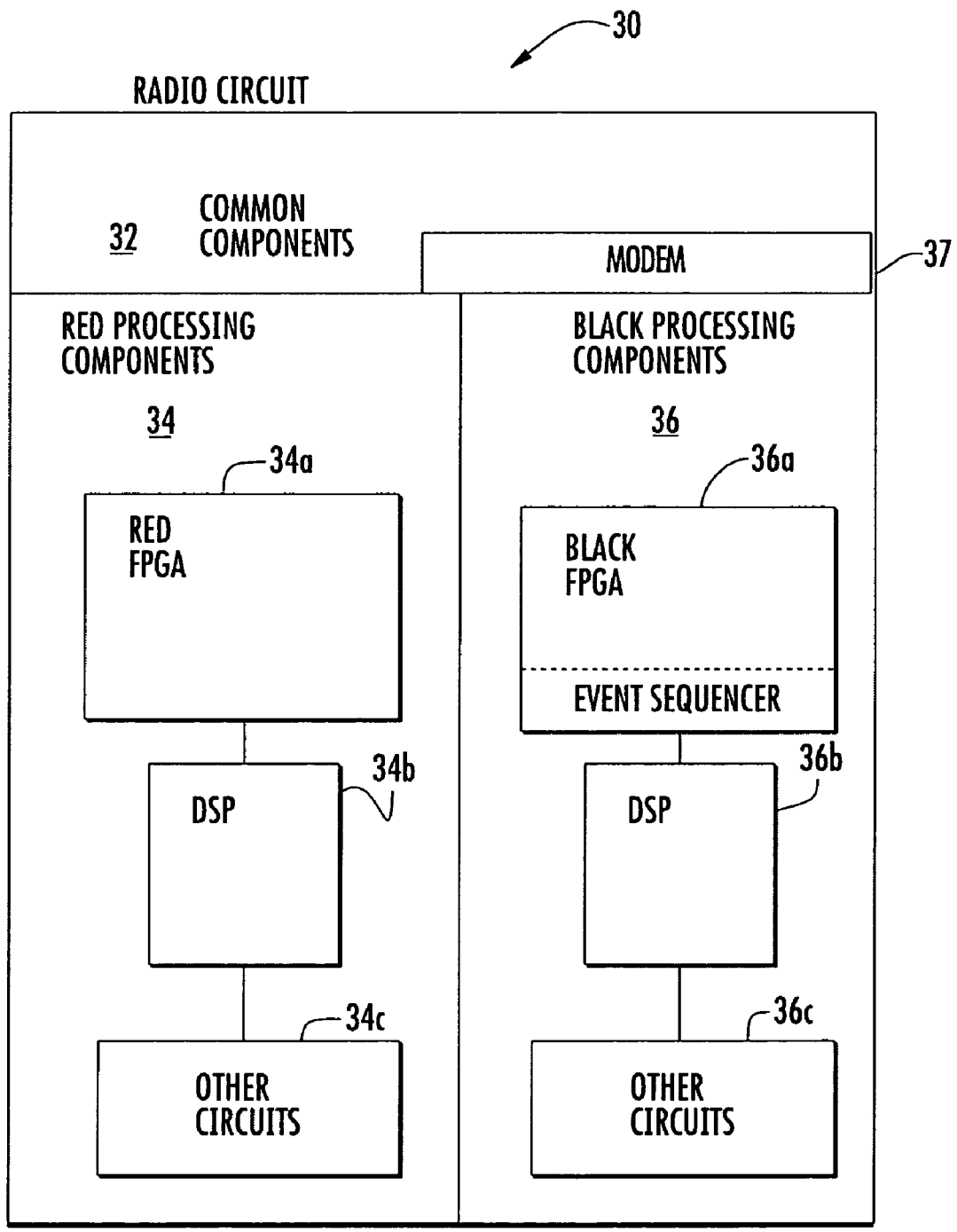
FIG. 2 is a high-level block diagram of a typical radio circuit used in a software defined radio.

A basic radio circuit 30 such as used in a software defined radio as described above is shown generally by the block diagram at 30 (FIG. 2) and includes common radio components indicated generally at 32 and red processing components 34 and black processing components 36 operable with modem 37. Each of the red and black processing components 34,36 include a field programmable gate array 34a, 36a, digital signal processor 34b, 36b, and other circuit components 34c, 36c known to those skilled in the art.

Figure 3:
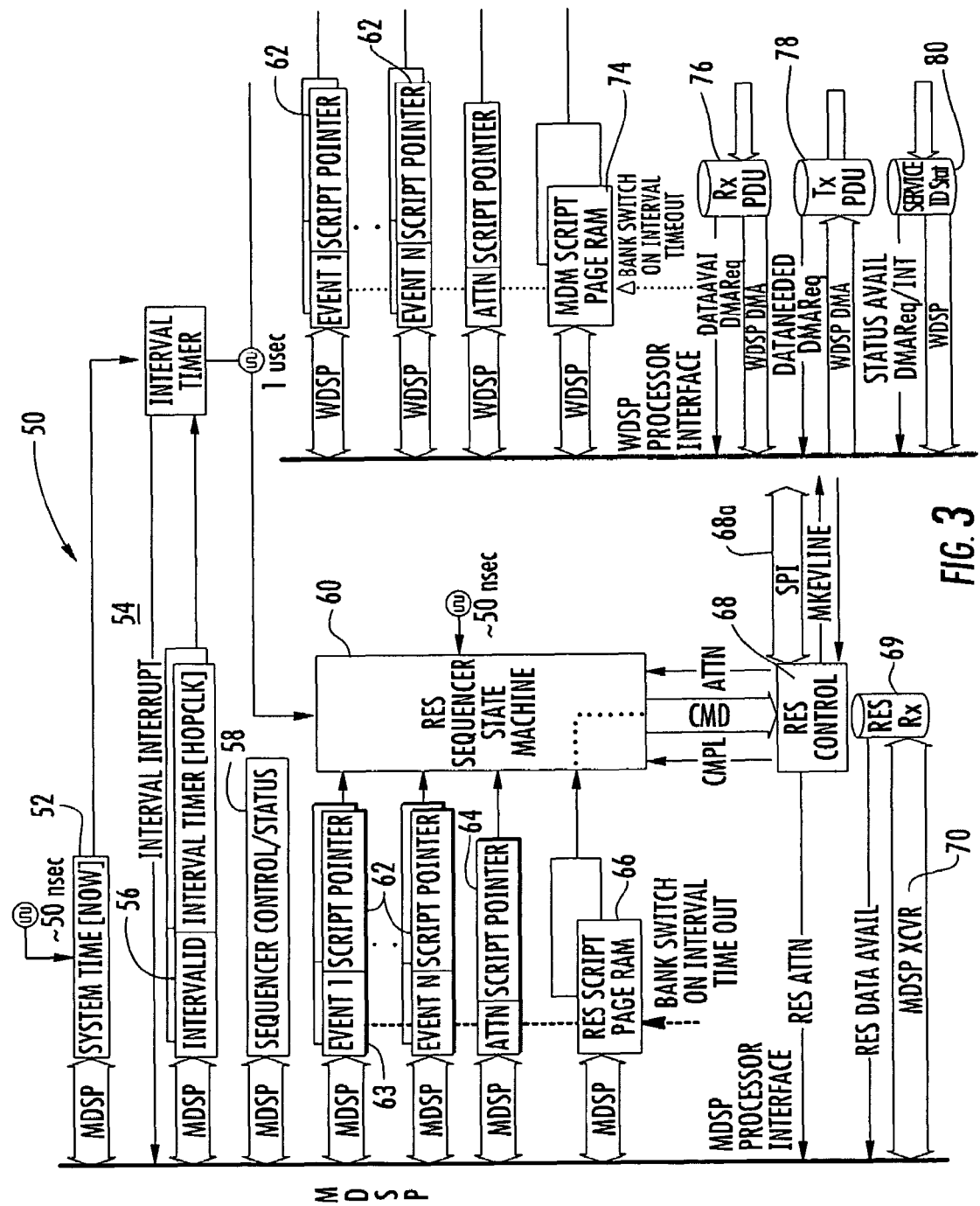
FIG. 3 is a high-level block diagram of the sequencer hardware in accordance with a non-limiting example of the present invention.

FIG. 3 is a high-level block diagram illustrating an example of hardware components for the event sequencer associated with a wideband networking modem and radio control sequencer, and illustrated generally at 50. Synchronizing and signaling in the network with the precision that is necessary makes it attractive to orchestrate the on air protocol with a hardware based event sequencer. In this circuit, a hardware facility is developed that allows distinct events of a particular interval to be programmed with an associated radio and modem configuration. These events are capable of being scheduled consistent with any necessary timing. Furthermore, once a given set of future events are programmed into the event sequencer, the other radio resources can be devoted to other processing activities, or put to sleep for the sake of power savings. Different sequences facilities can be available.

The system includes a system timer circuit 52 that is operative with the other circuits for multi-dimensional signal processing. An interval timer 54 can output an interrupt, and receives an interval/ID with an interval timer (HOPCLK) from the digital signal processor as a MDSP. Other operations and functions include the sequencer control/status 58 and the RES sequencer state machine 60 that receives signals as a script pointer 62, including events 63 and ATTN 64. It is also operative with the RES script page RAM 66 that receives the bank switch on an interval timeout. The RES control 68 is operative with the receive RES 69 and the digital signal processor as a MDSP transceiver 70 as illustrated. The MDM script page RAM 74 receives a bank switch on an interval timeout and is operative with the WDSP processor interface.

The receiver data unit as a PDU 76 and a database is also operative with the WDSPDMA channel and the transmit PDU 78 and the service IDSTAT 80.

Various of the active components and other event sequencer processes are now explained. System time 52 is typically a 64-bit incrementation of radio system time. This is tied into the radio platform, time of day (TOD) service, and is capable of being read by the MAC (Media Access Control) and the hardware facilities that make up the event sequencer and the modem.

The interval timer 54 is typically a programmable repeating or one-shot timer. Software can use this timer to indicate the boundary of a time interval of interest. For example, the end of the beacon interval could be signaled by this timer going off. The interval timer hardware is shadowed so that the software can program the next interval timer before the current timer goes off. The MDSP is operative with the interval/ID and timer.

Event timers can be programmable one-shot timers to be used within the current interval. They are accurate to within a one microsecond boundary of the system time. Each event 63 can have an associated script page RAM pointer that is used to perform some configuration when the event occurs. For example, a given event may be associated with a RES frequency change. The event timer hardware is shadowed so that software can program the next set of event timers before the current set are finished.

Script pointers 62 are typically pointers into the sequencer script page RAM memory 66. These allow the events to trigger a series of configuration commands. The script page RAM memory 66 is a bank switched page of sequencer memory, which is pointed to by the different events 63, 64 and associated with the current interval. Bank switch typically occurs on an interval timer expiration. Page RAM 66 is shadowed so that the software can program the next interval of commands before the current interval is finished.

Buffers 76, 78, and 80 can be included for storage of receive transmit data, voice, and beacons produced and consumed by the modem. DMA transfer is possible between a Modem and the WDSP.

An attention vector could be incorporated [MDM/RES] as the location to jump to in the event that there is an error indication from the hardware module that is attached to the event sequencer. The radio can be placed in a benign configuration, while software catches up with the fault that has occurred.

The modem could be incorporated as a hardware based burst modem. It could support all data, voice, and beacon signaling necessary for networking support. This represents the configuration of bandwidth, spectral efficiency and duration. The Modem indicates when it is complete with a given operation to the sequencer and whether an error has occurred, for example, an underflow or overflow.

The RES control 68 are typically configuration and control commands sent to the receiver and transmitter over the SPI control bus 68a, indicated when it is complete with a given sequence of commands and whether an error has occurred.

The event sequencer 50 can have an application programming interface (API). Commands can be written to the sequencer through the API. Commands can control either the modem or the RES using a distinct instance of the sequencer. Each instance of the sequencer can be tied to the same interval and system timers. Their events and page RAM could be distinct.

Various calls include stop for stopping the event sequencer and the associated event configuration, and Start for starting the event sequencer interval timer and event processing. The Start command performs an implicit bank switch of the shadowed hardware to allow the software to program an initial configuration before starting.

A program interval timer call can create a point in time that the event sequencer will generate an interrupt and switch from one set of shadowed event registers and page script RAM to another. This command can be performed while the event sequencer is running or when it is stopped. An interval timeout can command a callback routine and execute it when an interval timer expires.

A set event call or command is a microsecond offset from the beginning of the interval and points to a script and sets an event to fire at a particular point in the interval. The event time is typically with reference to the beginning of the interval and is typically accurate to within one microsecond. When the event sequencer is running, this call is programming an event for the next interval. When the event expires, the script pointer is used by the event sequencer to execute a series of sequencer commands on the controlled instance.

A Set Attn command as a pointer to script is operative if a controlled instance asserts the attention line. The event sequencer vectors to this spot in the page RAM to execute a set of pre-configured error handling commands.

A Write Script Memory command is operative as a primitive that allows the software to configure a particular configuration of the controlled instance by associating a set of event sequencer commands with a given event. Commands can be read out of the script page RAM 66 based on a pointer that is associated with a particular event.

The event sequencer 50 is operable as an IP core that is part of a Field Programmable Gate Array (FPGA) common in the software defined radio. The event sequencer is intended to be used in applications where it is beneficial to have the FPGA portion of the waveform capable of timing events and controlling FPGA resources with tight timing control. As will be explained below, the event sequencer include two major components, a sequencer event queue and a sequencer CPU. The sequencer event queue includes an ordered queue of timed events, and a comparator that triggers interrupts when events expire.

An event can include a 24-bit time value and an 8-bit tag value. The events can be written into the queue by the WDSP, and are removed from queue in a First In/First Out (FIFO) manner as the events expire. The queued events can be handled in a First In/First Out (FIFO) manner, so the events typically are written into the queue in chronological order. The oldest event in the queue is the pending event. When the time value of the pending event matches the system time, an interrupt is sent to the CPU, and the TAG value is saved. The event is removed from the queue, bringing in a new pending event. The CPU has been interrupted and can read the saved tag value and execute an appropriate program to handle the event.

The event sequencer CPU is typically a simplistic, 8-bit CPU. It receives interrupts from the expired events, and a number of system faults and conditions. It can read and write to a number of devices, including an octal digital-to-analog converter, a modem core, and the keyline register. It has a program memory that is written by the WDSP, and an internal ram memory.

Figure 4:
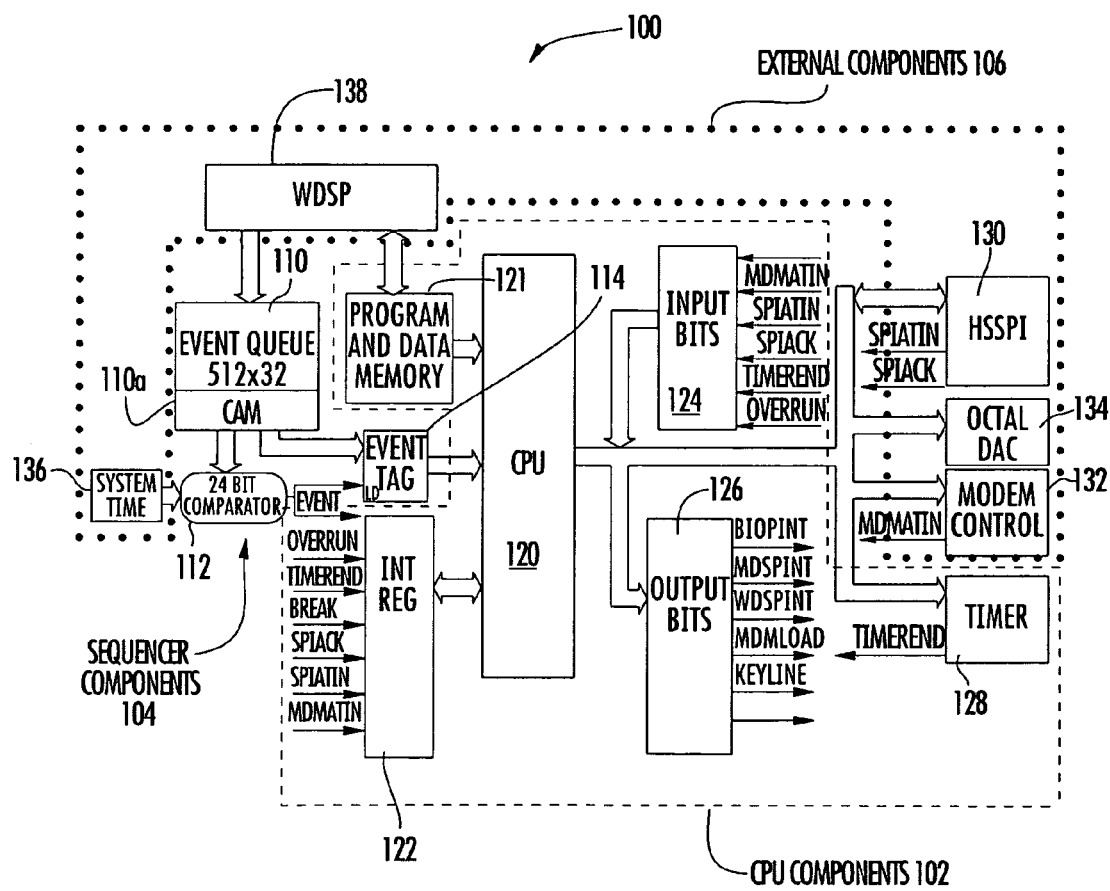
FIG. 4 is a high-level block diagram of the event sequencer in accordance with a non-limiting example of the present invention and showing CPU components, external components and sequencer components.

The non-limiting example of the event sequencer, shown in FIG. 4 at 100, includes processor or central processing unit (CPU) components 102 and sequencer components 104 and external components 106. The sequencer components 104 include an event queue as an event memory 110, a time comparator 112, for example 24-bit comparator, and event TAG register 114. An event contents addressable memory (CAM) 110*a* can be included as illustrated. The CAM 110*a* can hold events as well as the event queue, which can be addressed in any order, or a combination of event queue and event CAM connected such that one feeds into the other. The CPU components include the CPU 120, and an associated PROM, RAM, timer, interrupt controller and output and input bit registers. Various components are illustrated as part of CPU components, including an interrupt register 122, input and output bit registers 124, 126, and timer control 128. The CPU 120 is operable as an event program processor and has additional interfaces to external components such as a HSSPI 130, a modem control 132, and an octal DAC 134. In addition, the CPU drives interrupts to a WDSP, MDSP, and BIOP, and controls a keyline. External components system timer counter 136 and WDSP 138 are shown in FIG. 4.

The event queue 110 contains a series of sequenced events. For example, each event could be formed as a 24-bit fractional second time and an 8-bit event tag. The range of the fractional bit time is 0 to 9,599,999 (0x0 to 0x927BFF), which represents 0 to 1 seconds, with each count representing 104.166 nanoseconds. A tag is typically an arbitrary 8-bit value that the processor can use to identify which program the CPU should run when the event triggers.

Events typically are written to the event queue 110 in the order in which they will occur. The oldest event still in the queue is a pending event. When the event time of the pending event is equal to a fractional second portion of the system time, the pending event is considered to be triggered. Upon triggering, the event tag register 114 can be loaded with the event tag and the event sequencer interrupt triggered. The event is removed from the queue and the next event becomes the pending event. In addition, if the previous tag is not read from the tag register before the new tag is loaded, an event sequencer overflow interrupt is triggered.

The time comparator 112 causes the pending event to trigger at the appropriate time. It compares the event time of the pending event to the fractional seconds time of the system time counter 136. Since the fractional seconds of the system time uses 25 bits, the least significant bit of the system time counter is ignored, giving the event time the resolution of about 104.166 nanoseconds in this non-limiting example. When the time comparator 112 triggers, the pending events tag is loaded into the TAG register 114 and the pending event is removed from the queue 110. The next event in the queue becomes the new pending event. If the pending event triggers while the CPU is running, an overrun error occurs.

The tag register 114 can be loaded with the event tag of the pending event when the pending event is triggered. The tag register can be read by the CPU to determine which program to run.

The sequencer CPU or event program processor 120 can be formed as a simple 8-bit CPU. It can run short event programs in response to interrupts. After any program runs, the CPU can return to a sleep state and wait for the next interrupt. The interrupts can be generated by the compare register and a number of fault conditions from waveform components. The CPU typically has its own program and data memories 121, and interrupt controller, and an internal timer. It has interfaces to the HSSPI 130, octal DAC 134, modem control 132, and input and output bit registers 124, 126.

An interrupt controller can have a number of interrupt sources, which include the event comparator 112, and a number of fault and status signals. The interrupt controller can use a mask register for enabling and disabling interrupt sources. When an interrupt occurs, the CPU reads the interrupt register, and scans the bits to figure out what caused the interrupt, and executes an appropriate interrupt handler routine. If the interrupt came from the comparator, the CPU reads the TAG register 114, and uses the TAG register 114 to determine which program to run.

The CPU fetches code and data tables from a 2048×8 CPU PROM, in one non-limiting example, which can be implemented using a dual port RAM. The WDSP can connect to a read/write port, and the CPU can connect to a read only port. The CPU PROM typically is read by the CPU. The PROM can be programmed by the WDSP, and can be changed by the WDSP at any time, including while the CPU is actively running. The tables in the PROM typically can be updated frequently to reflect changes in frequencies and modulation schemes. The CPU could have a 64×8 RAM for storing and retrieving data.

The CPU can have an 8-bit input bit register 124 for obtaining bit statuses from waveform components as illustrated in FIG. 3. The CPU can have an 8-bit output bit register for controlling waveform components. These output bits could include interrupt lines (INT) going to various processors. The BIOP can set a HSSPI multiplexer so that control and status are routed to the sequencer CPU 120. This allows the CPU to read and write to the HSSPI 130 in response to events or alarm conditions.

The CPU can also write to the octal DAC 134. The CPU can be one of the different octal DAC control sources, such as one of five in non-limiting examples, and the software ensures that various sources are not sending conflicting octal DAC commands. The CPU can control any of the eight octal DAC outputs.

The CPU can load a new modem configuration in response to a sequencer event by writing or toggling a control word. The CPU can have a built in timer that can be used to insert delays in a program execution. In one non-limiting example, a timer can delay up to 0.872 seconds in 52 nanosecond increments. The timer can have a 3-bit register that typically is written from the least significant byte to the most significant. After the specified time expires, the signal can be sent to both an interrupt controller and the input bit register 124.

The WDSP interface is typically a 16-bit asynchronous parallel interface. The interface can have an address space of about eight words and support word accesses. Data transfer timing is determined by the waveform core.

A standardized register naming convention can be used to ease the operation of both FPGA and software design. FPGA registers that are not part of an IP core can use a first letter to indicate the FPGA on which they reside and a second letter to indicate a processor interface. Registers that are part of an IP core could have the first letter I, and a second and third letter could be specific to the IP module. The registers for the event sequencer could start with IES. The remaining letters of the register name could be indicative of the register's function.

The event sequencer can be implemented as an IP core using the radio FPGA designers IP core standard. This standard requires that the IP block have its own register block and interrupt generator. Individual interrupt sources can also be brought out of the device to avoid layered interrupts.

In one non-limiting example of the present invention, the sequencer CPU can have seven internal registers that are used for manipulating data, program branching, loading and storing. Each register can have a 3-bit register number that is used to encode the registers in machine code instructions. The sequencer CPU decodes and executes the 8-bit opcodes read from the program memory at the location of the register. Each opcode can have zero, one, or two associated operands that could be read from memory following the opcode fetch.

An assembler for the sequencer CPU can facilitate the generation of varying programs for the event sequencer. This assembler can be similar to many commercially available assemblers for 8-bit microcomputers. The assembler can convert a source file containing labels, directives, comments and assembler instructions into an output file containing the raw machine coded program. The assembler can be written in the language RUBY, in one non-limiting example, which is a freely distributed, open source language that is available for almost every popular computing platform. The assembler could also be provided in a DOS executable manner for use in a radio development environment. The assembler instructions can be derived from the machine instructions of the CPU.

The assembler and CPU can be linked to the same instruction set, and thus any modification of the CPU may necessitate a modification of the assembler. It may be necessary or convenient at some point to add or remove instructions from the CPU and assembler.

The CPU can be implemented in VHDL code of the sequencer in a module, which decodes a high order nibble to determine the type of instruction. It may further decode some of the lower order nibble to determine the exact instruction as well as parameters and options.

To add a new instruction to the CPU, the system can determine how to fit it into the instruction mapping. This can be accomplished by adding a new instruction type decode for a new upper nibble code, or by adding it as a subtype of an existing instruction type. A constant should be added for the nibble decode in the list of instruction types. The actual code for executing the instruction can be located in the process that defines the state machine.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software defined radio comprising:
   a radio circuit, modem and modem control circuit and executable radio software system operable with the radio circuit, modem and modem control circuit and defining an operating environment that allows a waveform application to operate with the radio circuit, modem and modem control circuit for transmitting and receiving voice and data; and
   a processor, including an event sequencer, operative for coordinating the configuration of the radio circuit and modem control circuit and controlling the sequence and timing of events in a predetermined time interval in the radio circuit and modem control circuit for an associated radio and modem configuration, said event sequencer further comprising at least one of an event queue for holding a series of events in sequence and event contents addressable memory (CAM) for holding events that can be accessed in any order and a time comparator operative with at least one of the event queue and event CAM that triggers an interrupt when events expire and causes a pending event to trigger at a predetermined time.

2. A software defined radio according to claim 1, wherein the event queue and event CAM are connected such that one feeds into the other.

3. A software defined radio according to claim 2, wherein each event contained within the event queue or event CAN comprises an event tag having a value used for identifying an event program to be run.

4. A software defined radio according to claim 2, and further comprising a fractional bit time value stored within the event queue indicative of the time for an event.

5. A software defined radio according to claim 1, wherein said event sequencer includes an event program processor for determining an event program to be run.

6. A software defined radio according to claim 5, wherein said event sequencer includes a tag register that holds event tags indicative of a program to be run, wherein said event program processor is operative for reading said tag register and determining which event program is to be run.

7. A software defined radio according to claim 6, and further comprising a memory, timer and interrupt controller operative with said event program processor such that an interrupt can be generated at a specified time to allow said event program processor to read said tag register.

8. A software defined radio according to claim 1, and further comprising a portable housing on which said radio circuit and processor are contained and configured for handheld use.

9. A software defined radio comprising:
   a radio circuit, modem and modem control circuit and executable radio software system operable with the radio circuit, modem and modem control circuit and defining an operating environment that allows a waveform application to operate with the radio circuit, modem and modem control circuit for transmitting and receiving voice and data; and
   a field programmable gate array (FPGA) operable with the radio circuit, said FPGA including an event sequencer operative for coordinating the configuration of the radio circuit and modem control circuit and controlling the sequence and timing of events in a predetermined time interval in the radio circuit, and modem control circuit for an associated radio and modem configuration, said event sequencer including sequencer components for holding events and event tags, and processor components operative with the sequencer components for identifying event tags and running event programs identified by said event tags for an associated radio and modem configuration, said event sequencer further comprising at least one of an event queue for holding a series of events in sequence and event contents addressable memory (CAM) for holding events that can be accessed in any order and a time comparator operative with at least one of the event queue and event CAM that triggers an interrupt when events expire and causes a pending event to trigger at a predetermined time.

10. A software defined radio according to claim 9, wherein said sequencer components include an event queue for holding a series of events in sequence or an event CAM for accessing events, or a combination of event CAM and event queue.

11. A software defined radio according to claim 10, wherein each event contained within the event queue or event CAN comprises an event tag having a value used for identifying an event program to be run.

12. A software defined radio according to claim 10, and further comprising a fractional bit time value stored within the event queue and indicative of the time for an event.

13. A software defined radio according to claim 9, wherein said processor components include a processor for reading an event contained within an event queue, determining an event program to be run, and timing events in the radio circuit.

14. A software defined radio according to claim 13, wherein said sequencer components include a tag register that holds event tags indicative of an event program to be run, wherein said processor is operative for reading said tag register and determining which program is to be run.

15. A software defined radio according to claim 14, wherein said processor components include a memory, timer and interrupt controller operative such that an interrupt can be generated at a specified time to permit reading of any event tags.

16. A software defined radio according to claim 9, and further comprising a portable housing in which said radio circuit and FPGA are contained and configured for handheld use.

17. A method for controlling the timing of events within a radio circuit, modem and modem control circuit of a software defined radio, which comprises:
  loading a waveform application operative with the radio circuit for transmitting and receiving voice and data; and
  coordinating the configuration of the radio circuit and modem control circuit and controlling the timing and sequence of events in a predetermined time interval in the radio circuit, modem and modem control circuit through an event sequencer contained within a Field Programmable Gate Array (FPGA) and operable with the radio circuit, modem and modem control circuit;
  holding a series of events in sequence within an event queue or to be accessed in any order within an event contents addressable memory (CAM); and
  comparing an event time of a pending event and triggering interrupts when events expire and causing the pending event to trigger at a predetermined time.

18. A method according to claim 17, which further comprises holding a series of events in sequence within an event queue of the event sequencer.

19. A method according to claim 18, which further comprises identifying an event program to be loaded by reading the value of an event tag within the event sequencer.

20. A method according to claim 19, which further comprises timing each event using a fractional bit time value contained within the event sequencer.

21. A method according to claim 17, which further comprises forming a portable wireless communications device in which the radio circuit is contained.

22. A method according to claim 17, which further comprises forming a pair of radio subsystems as a command and data radio subsystem.

* * * * *